∂ ⌐¹
8/28/79    4,165,923

United States Patent [19]

Janning

[11] 4,165,923
[45] Aug. 28, 1979

[54] LIQUID CRYSTAL ALIGNMENT STRUCTURE

[75] Inventor: John L. Janning, Dayton, Ohio

[73] Assignee: NCR Corporation, Dayton, Ohio

[21] Appl. No.: 931,583

[22] Filed: Aug. 7, 1978

Related U.S. Application Data

[60] Continuation of Ser. No. 769,257, Feb. 16, 1977, which is a continuation of Ser. No. 480,666, Jun. 19, 1974, which is a division of Ser. No. 386,472, Aug. 7, 1973, Pat. No. 3,834,792, which is a continuation of Ser. No. 242,675, Apr. 10, 1972, abandoned.

[51] Int. Cl.² .................... C09K 3/34; B05D 5/12; C23C 11/00
[52] U.S. Cl. .................... 350/341; 427/109; 427/250; 427/255; 428/1; 428/144; 428/148
[58] Field of Search ................ 350/341; 427/109, 250, 427/255; 428/1, 144, 145, 148, 432, 433, 434

[56] References Cited

U.S. PATENT DOCUMENTS

| | | |
|---|---|---|
| 2,400,877 | 5/1946 | Dreyer . |
| 2,524,286 | 10/1950 | Dreyer . |
| 2,544,659 | 3/1951 | Dreyer . |
| 2,776,598 | 1/1957 | Dreyer . |
| 2,860,221 | 11/1958 | Kohl . |
| 2,906,648 | 9/1959 | Kohl . |
| 3,046,839 | 7/1962 | Bird . |
| 3,063,867 | 11/1962 | Emery . |
| 3,173,801 | 3/1965 | Lipkis . |
| 3,218,496 | 11/1965 | Jensen et al. . |
| 3,322,485 | 5/1967 | Williams . |
| 3,353,895 | 11/1967 | Emerson . |
| 3,388,002 | 6/1968 | Foster . |
| 3,391,022 | 7/1968 | Saito . |
| 3,499,112 | 3/1970 | Heilmeier et al. . |
| 3,524,726 | 8/1970 | de Koster . |
| 3,540,796 | 11/1970 | Goldmacher et al. . |
| 3,597,043 | 8/1971 | Dreyer . |
| 3,656,834 | 4/1972 | Haller et al. . |
| 3,674,341 | 7/1972 | Hedman, Jr. et al. . |
| 3,687,515 | 8/1972 | Haas et al. . |
| 3,694,053 | 9/1972 | Kahn . |
| 3,700,306 | 10/1972 | Cartmell et al. . |
| 3,731,986 | 5/1973 | Ferguson . |
| 3,749,474 | 7/1973 | Cartmell . |
| 3,781,085 | 12/1973 | Leibowitz . |
| 3,785,721 | 1/1974 | Harsch . |
| 3,811,751 | 5/1974 | Meyer . |
| 3,834,792 | 10/1974 | Janning . |
| 3,944,331 | 3/1976 | Janning ............... 350/341 |
| 3,964,158 | 6/1976 | Janning . |
| 3,967,883 | 7/1976 | Meyerhofer . |
| 4,043,647 | 8/1977 | Oue et al. ............... 350/341 |
| 4,083,099 | 4/1978 | Yano et al. ............... 428/1 |
| 4,084,884 | 4/1978 | Raynes ............... 350/341 |
| 4,116,658 | 9/1978 | Sano ............... 350/341 |

OTHER PUBLICATIONS

Janning, J, "Thin Film Surface Orientation for Liquid Crystals," Appl. Phys. Lett, vol. 21, No. 4, Aug. 15, 1972, pp. 173-174.

Holland, Vacuum Deposition of This Films, John Wiley and Sons (1956), pp. 218-220, 331-335, 386-397, and plate 10.

Smith, "Anisotrophy in Permalloy Films," Journal of Applied Physics, suppl to vol. 30, No. 4, (Apr. 1959), pp. 2645-2655.

Nieuwenhuizen et al., "Microfractography of Thin Films," Phillips Technical Review, vol. 27, No. 3/4, (1966). pp. 87-91.

van de Waterbeemd et al., "Effect of the Mobility of Metal Atoms on the Structure of Thin Films Deposited at Oblique Incidence", Phillips Research Reports, vol. 22 (1967), pp. 375-387.

Zocher, "Some Topics of Liquid Crystals Yet to be Discussed", Molecular Crystals and Liquid Crystals, vol. 7, (1969), pp. 165-180.

Saupe, "Recent Results in the Field of Liquid Crystals", Angew., Chem. Internat. Edit., vol. 7, No. 2 (1968), pp. 97-110.

Dreyer, "The Alignment of Molecules in the Nematic Liquid Crystal State", Liquid Crystals and Ordered Fluids, Plenum Press (1970), pp. 311-320.

Schadt et al., "Voltage-Dependent Optical Activity of a Twisted Nematic Liquid Crystal", Applied Physics Letters, vol. 18, No. 4, (15 Feb. 1971), pp. 127-128.

Gladstone et al., "Liquid Crystal Display Devices", IBM Technical Disclosure Bulletin, vol. 14, No. 5 (Oct. 1971), pp. 1471-1473.

Wagner, "Substrate Treatment for Liquid Crystal Display", IBM Technical Disclosure Bulletin, vol. 13, No. 10, (Mar. 1971), p. 2961.
Koenig et al., "About the Structure of Obliquely Vapour-Deposited Layers and the Influence Thereof on the Development of Submicroscopic Roughness", Optik, vol. 6, No. 1, (1950), pp. 111-124.
Hass; G., "Preparation, Structure, and Application of Thin Films of Silicon Monoxide and Titanium Di-oxide", Journal of the American Ceramic Society, vol. 33, No. 12, (1 Dec. 1950), pp. 353-360.

*Primary Examiner*—William R. Dixon, Jr.
*Attorney, Agent, or Firm*—J. T. Cavender; Lowell C. Bergstedt; James T. Williams

[57] ABSTRACT

The present invention relates to a liquid crystal display cell having an alignment film therein. The present invention also relates to a method of aligning liquid crystal molecules in a selected direction in a liquid crystal display cell. An alignment film whose film growth is oriented in the same direction is deposited on an electrode film of a liquid crystal cell. The alignment film is used to align the molecules of a liquid crystal material. The film growth sympathetically aligns the molecules of liquid crystals in the direction of the film growth. A liquid crystal display cell which has two such alignment films therein is used to form a polarizing liquid crystal display cell.

18 Claims, 10 Drawing Figures

LIQUID CRYSTAL ALIGNMENT STRUCTURE

This application is a continuation of application Ser. No. 769,257, filed Feb. 16, 1977 which is a continuation of application Ser. No. 480,666, filed June 19, 1974, which is a division of application Ser. No. 386,472, filed Aug. 7, 1973 (now U.S. Pat. No. 3,834,792, issued Sept. 10, 1974), which is a continuation of application Ser. No. 242,675, filed Apr. 10, 1972 now abandoned.

This application is related to application Ser. No. 480,665, filed June 19, 1974 (now U.S. Pat. No. 3,964,158, issued June 22, 1976), which is also a division of application Ser. No. 386,472, filed Aug. 7, 1973 (now U.S. Pat. No. 3,834,792, issued Sept. 10, 1974).

BACKGROUND OF THE INVENTION

In the prior art a method of aligning molecules of a liquid crystal material in a chosen direction involves the step of rubbing the surface of an electrode film on a substrate in a chosen direction with a rubbing cloth. The rubbing causes the material of the surface of the electrode film on the substrate to be oriented into the chosen direction. When a liquid crystal material is placed on the rubbed electrode film, the molecules of the liquid crystal material are sympathetically aligned in the direction of rubbing of the electrode film. A liquid crystal display cell, which has two electrode films which are rubbed in perpendicular directions, is also known in the prior art.

In the present invention a thin alignment film whose film growth is orientated by vacuum deposition in a given direction is formed on an electrode film. The thin alignment film will, according to present theory, sympathetically align liquid crystal molecules of a liquid crystal material, when said liquid crystal material is placed on said thin alignment film. The thin alignment film is grown in a desired direction by vacuum depositing material on the electrode film from a large angle relative to the normal of the electrode film. Two such thin alignment films may be used on two electrode films of a liquid crystal display cell to form a polarizing liquid crystal display cell.

The method of the present invention given more consistent and predictable alignment results than the prior art method. The rubbing method of the prior art is pressure sensitive and not easily reproducible whereas the alignment film of the present invention is more reproducible due to the use of vacuum deposition which may be accurately controlled.

SUMMARY OF THE INVENTION

The present invention relates to a method of making an alignment film for liquid crystal material on a substrate comprising depositing an alignment film of a selected material at a selected angle to a substrate in order to form a film growth of said alignment film at said selected angle to said substrate.

An object of the present invention is to provide an alignment for aligning molecules of a liquid crystal material.

Another object of the present invention is to provide a liquid crystal display cell which has an alignment film on each of two electrode films thereof in order to align molecules of a liquid crystal material therein.

A further object of the present invention is to form a liquid crystal display cell wherein an alignment film is deposited on an electrode film having an image-forming pattern etched therein.

Still another object of the present invention is to provide a liquid crystal display cell including an alignment film which has an image-forming pattern etched therein.

DESCRIPTION OF THE PREFERRED EMBODIMENT

Figure 1:
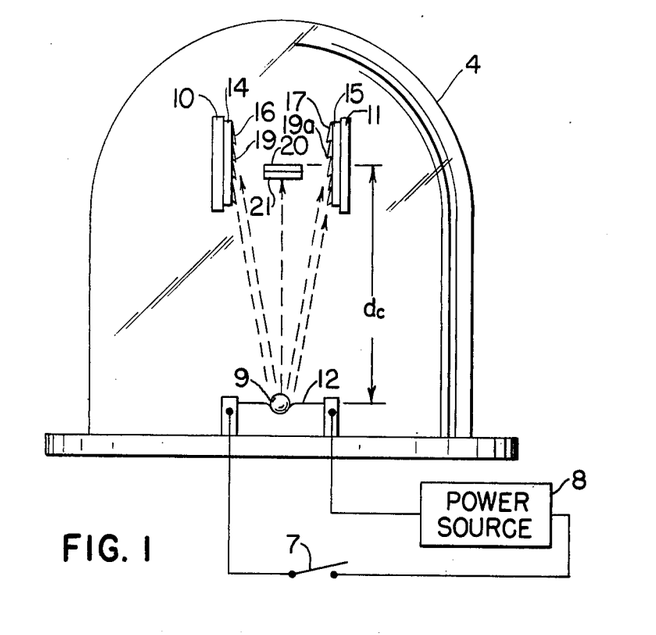
FIG. 1 is a diagrammatic view of an evaporation system for forming an alignment film on each of two substrates.
Figure 5:
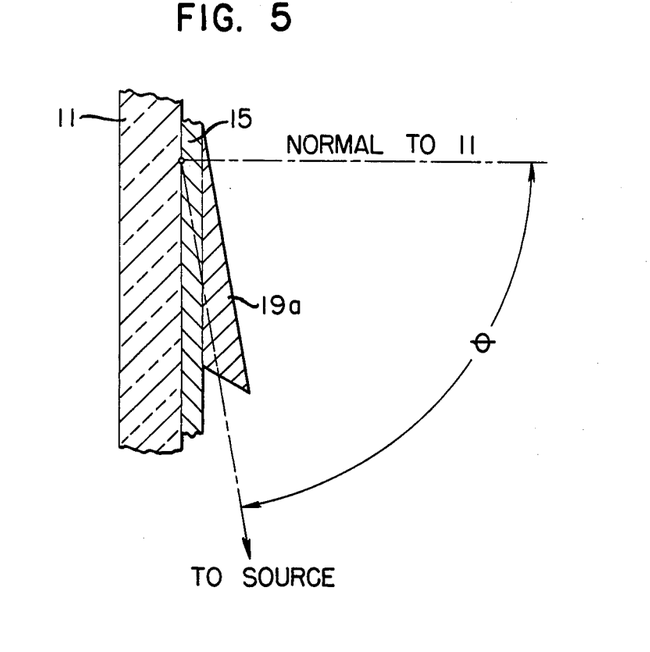
FIG. 5 is a sectional view of an alignment film of FIG. 4.

As shown in FIG. 1, substrates 10 and 11, such as glass substrates, having electrode films 14 and 15, such as tin oxide electrode films, previously formed thereon, are positioned in a vaccum chamber 4. A vacuum deposition source 12 for an alignment material 9, such as platinum, gold, tin, lead, aluminum, copper, silver, silicon monoxide or chromium, is located beneath the substrates 10 and 11. The substrates 10 and 11 may be any nonconductive substrates. The electrode films 14 and 15 are conductive electrode films. The electrode films 14 and 15 are transparent. The vacuum deposition source 12 is used to vacuum deposit alignment films 16 and 17 of alignment material 9 on the electrode films 14 and 15 at a chosen angle to the normal to the substrates 10 and 11. In the present embodiment, the normals to the surfaces of the electrode films 14 and 15 each makes a chosen angle $\theta$ of approximately 80 degrees with a line between the substrates 10 and 11 and the evaporation source 12. As shown in FIG. 5, the angle $\theta$ is the measure of that angle formed by the substantially coincident normals to the respective surfaces of both the substrate 11 and the electrode film 15 formed thereon, where applicable and the line drawn between the base of the normal to the surface of the substrate 11 and the evaporation source 12. In a similar manner the angle $\theta$ is the measure of that angle formed by the substantially coincident normals to the respective surfaces of both the substrate 10 and the electrode film 14 formed thereon, where applicable, and the line between the base of the normal to the surface of the substrate 10 and the evaporation source 12. The larger the chosen angle $\theta$ the better will be the alignment of liquid crystal material later placed on the alignment films 16 and 17. However the larger the chosen angle $\theta$, the greater the amount of starting alignment material 9 needed to form a desired thickness of alignment films 16 and 17. Therefore a chosen angle $\theta$ of 80 degrees is considered optimum. A range of from 10 degrees to 89.9 degrees of $\theta$ will however serve to form alignment films 16 and 17. The alignment films 16 and 17 are formed on the electrode films 14 and 15 by vacuum deposition. The alignment films 16 and 17 could alternately be deposited directly on the substrates 10 and 11. Alternately the electrode films 14 and 15 themselves could be deposited at an angle on the substrates 10 and 11 and thus act simultaneously as alignment films and electrode films. The electrode films 14 and 15 would then be aligning electrode films. The electrode films 14 and 15 which are on substrates 10 and 11 respectively, are approximately 500 angstrom thick transparent tin oxide electrode films. The 80 degree angle in the illustrated embodiment made between the normals to the surfaces of the electrode films 14 and 15 and the point of the vacuum deposition source 12 of FIG. 1, is used to form film growths 19 and 19a of alignment films 16 and 17 at an angle of approximately 80 degrees to the normals to the surfaces of the electrode films 14 and 15. These film growths 19 and 19a of alignment films 16 and 17 are used to sympathetically align molecules of a liquid crystal material which is to be placed on the alignment films 16 and 17. A small amount of platinum or other alignment material is evaporated at a pressure of approximately $10^{-5}$ Torr from the vacuum deposition source 12 at an approximately 80 degree angle to substrates 10 and 11 for a short period of time to form film growths 19 and 19a of alignment films 16 and 17 on electrode films 14 and 15. In FIG. 1, 20 angstrom thick platinum alignment films 16 and 17 are evaporated on the 500 angstrom thick tin oxide electrode films 14 and 15 of substrates 10 and 11. The evaporation occurs when switch 7 is closed to heat the alignment material 9 to be evaporated. The evaporation process is a boiling process of the alignment material 9. The power for the heating comes from power source 8. Other materials which form film growths 19 and 19a, such as chromium, may be used as an alignment film. Platinum film growths 19 and 19a of alignment films 16 and 17 are formed on the tin oxide transparent electrode films 14 and 15 at an angle of approximately 80 degrees to the normal to the surfaces of the transparent electrode films 14 and 15. The angle $\theta$ is not very critical and may be from approximately 10 degrees to approximately 89 degrees. The thickness of the alignment film is not critical and may vary from 20 angstroms upward.

In the illustrated embodiment of FIG. 1, the distance da between the evaporation source 12 and points on the substrates 10 and 11 is approximately 10 inches. A control slide 20 is placed a distance dc of approximately 10 inches above evaporation source 12 with its lower surface facing toward the evaporation source 12. A control film 21 which is measurable is used to calculate the thickness of the alignment films 16 and 17 after evaporation has occurred. The control slide 20 is used to insure that the desired thicknesses of alignment films 16 and 17 are placed on the electrode films 14 and 15. The calculated thickness Ta of the alignment films 16 and 17 equals the measured thickness Tc of the control film 21 on the control slide 20, multiplied by the cosine of the chosen angle $\theta$, divided by da over dc quantity squared. By measuring the thickness Tc of the deposited control film 21 on the control slide 20, measuring the preset angle $\theta$ made between the normals to the surfaces of the transparent electrode films 14 and 15 and the evaporation source 12, and by measuring the preset distance d between the substrates 10 and 11 and the evaporation source 12, one can calculate the thickness Ta of the alignment films 16 and 17 by the thickness equation $$Ta = \frac{Tc \; \text{cosine} \; \theta}{(da/dc)^2}$$

A thickness of alignment films 16 and 17 of about 20 angstroms is used. Such thin alignment films 16 and 17 are electrically non-conductive. Such thin alignment films may actually be islands of alignment material.

Figure 2:
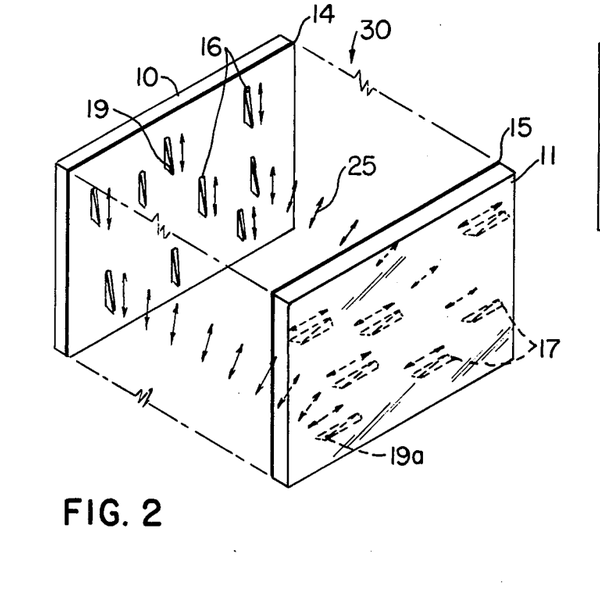
FIG. 2 is an isometric view of a liquid crystal display cell having two alignment films therein.

FIG. 2 is an isometric view which illustrates a fabricated liquid crystal display cell 30. The substrates 10 and 11 of the liquid crystal display cell 30 have tin oxide electrode films 14 and 15 and platinum alignment films 16 and 17 thereon, to either side of molecules 25 of a liquid crystal material. The alignment films 16 and 17 are used to sympathetically align molecules 25 of the liquid crystal material in the directions of the growths 19 and 19a of the alignment films 16 and 17. The film growth 19 of the alignment film 16 is pointing at right angles to the film growth 19a of the alignment film 17 due to the rotation of the substrate 11 of FIG. 1 by 90 degrees during the fabrication of liquid crystal display cell 30.

Figure 3:
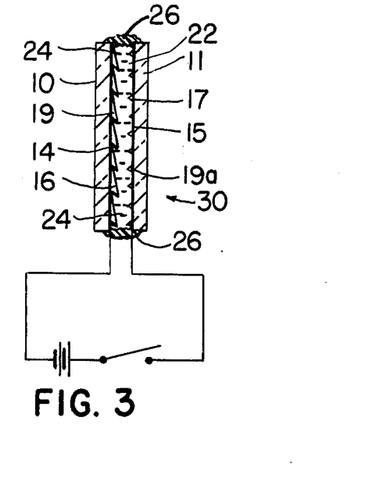
FIG. 3 is a sectional view of the liquid crystal display cell of FIG. 2.

As shown in FIG. 3, nematic liquid crystal material 22, such as 4-Methoxy, 4'n-Butyl-Benzylidene-Anilene (MBBA), is placed between the platinum alignment films 16 and 17 which are on the electrode films 14 and 15, prior to final sealing the liquid crystal display cell 30, with a sealer 26 having been placed around the periphery of the glass substrate plates 10 and 11 to seal the liquid crystal material 22 within the liquid crystal display cell 30. One half mil thick spacers 24 separate the two alignment films 16 and 17. The liquid crystal molecules of the left portion of the liquid crystal material 22 in the liquid crystal display cell 30 are aligned in a direction parallel to the direction of the platinum film growth 19 of alignment film 16. The liquid crystal molecules of the right portion of the liquid crystal material 22 in the liquid crystal display cell 30 are aligned in a direction parallel to the direction of the platinum film growth 19a of alignment film 17. The liquid crystal material 22 will thus rotate polarized light passing therethrough by 90 degrees since the molecules of the liquid crystal material 22 of the liquid crystal display cell 30 is twisted by 90 degrees.

Figure 4:
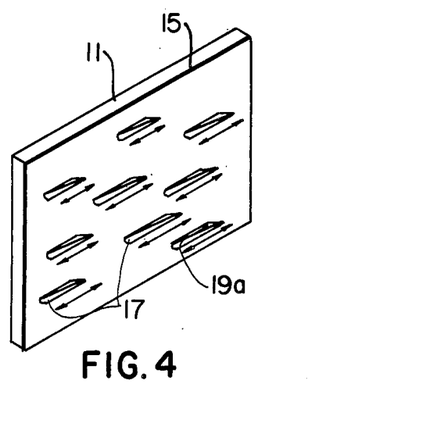
FIG. 4 is a perspective view of an alignment film of FIG. 2.

FIGS. 4 and 5 show the film growth 19a of the alignment film 17 of FIGS. 2 and 3 in greater detail. Also shown are electrode film 17 and substrate 11.

Figures 6, 7, 8, 9:
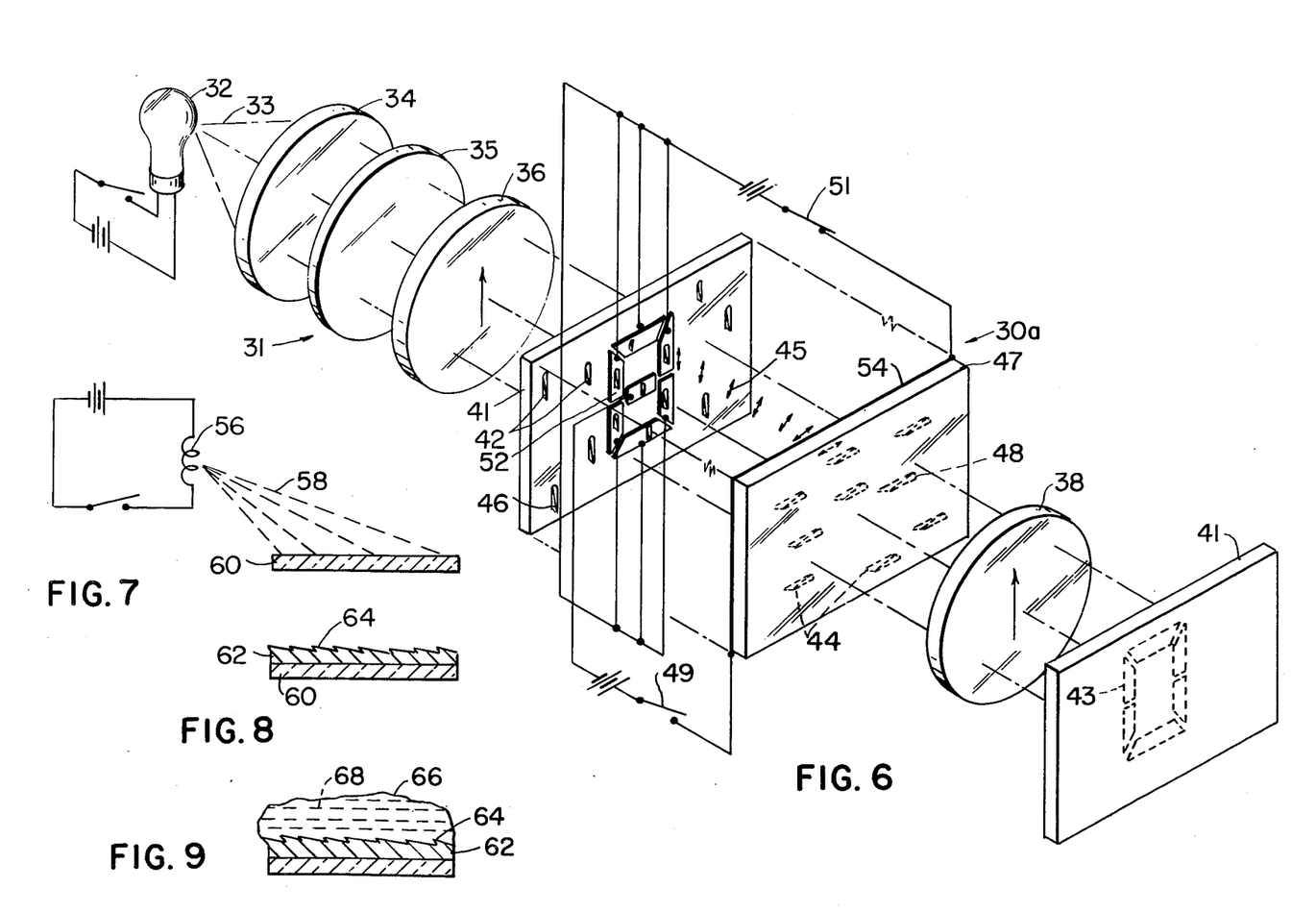
FIG. 6 is a diagrammatic view of an electro-optical system for reproducing an image which has been etched in an electrode film, the etched electrode film having an alignment film and a substrate thereunder.
FIG. 7 is a diagrammatic view of a deposition step for forming an alignment film on a substrate.
FIG. 8 is a sectional view, exaggerated for purposes of illustration, of a substrate which has an alignment film deposited thereon.
FIG. 9 is a sectional view, exaggerated for purposes of illustration, of a liquid crystal material having molecules of a liquid crystal material aligned by an alignment film on a substrate.

In FIG. 6, a liquid crystal display cell 30a is placed in an optical system 31 which includes a light source 32, such as an incandescent lamp. A collimating lens 34 collimates light 33 from the light source 32, and an optical filter 35 filters out the ultraviolet and infrared light before the light 33 passes through a polarizer 36 which is used to polarize the light 33. A polarizer 38 is used to analyze the plane in which light 33 is polarized by polarizer 36. A screen 41 is used to display a bright image of any of ten numerals formed of selected segments of a segmented numeral 52 of and "8" etched in a tin oxide electrode layer. The background of the pattern of the segmented numeral 52 is etched away from an electrode film previously deposited on the substrate 41 of the liquid crystal display cell 30a by standard photo etching technique to leave the segmented numeral 52. A thin nonconductive platinum alignment film 42 covers the total area of the substrate 41 and the segmented numeral 52. Another thin nonconductive platinum alignment film 44 covers an unetched electrode film 54 on the substrate 47. The segmented numeral 52 and electrode film 54 are transparent since they are very thin. The film growths 46 and 48 of the two alignment films 42 and 44 are at right angles. Molecules 45 of a liquid crystal material are aligned between alignment films 42 and 44.

A bright image of the segmented numeral of a "0" may be read out of the dark screen 41 of the display cell 30a by placing the display cell 30a between the polarizers 36 and 38, with the film growth 46 of the alignment film 42 parallel to the plane of polarization of the polarizer 36, with switch 49 open. The film growth 48 of the alignment film 44 is perpendicular to the plane of polarization of the polarizers 36 and 38.

When switch 51 is closed to create an electric field between the outer segments of the segmented numeral 52 and the electrode film 54 of the liquid crystal display cell 30a, the molecules of the liquid crystal material 45 in the display cell 30a, next to the outer segments of the segmented numeral 52 are oriented parallel to the electric field. Thus an image 43 of a "0" appears on the screen 41. When switch 51 is opened, the bright outer segments of the segmented numeral 52 disappears from the screen 41. Numerals zero to nine may be read out of the liquid crystal display cell 30a when a voltage is applied to selected segments of the segmented numeral 52.

FIG. 7 shows alignment material 58 being evaporated at a large angle relative to the normal to a substrate 60 to form an alignment film 62 shown in FIGS. 8 and 9. When the alignment material 58 is evaporated on the substrate 60 from the evaporation source 56 at a large angle, alignment film 62 is formed on the surface of the substrate 60 as shown in FIG. 8. The alignment film 62 has a film growth 64 therein.

As shown in FIG. 9, liquid crystal material 66 is placed on the alignment film 62. Molecules 68 of the liquid crystal material 66 which are adjacent to the alignment film 62 are aligned in the direction of the film growth 64 of the alignment film 62.

Figure 10:
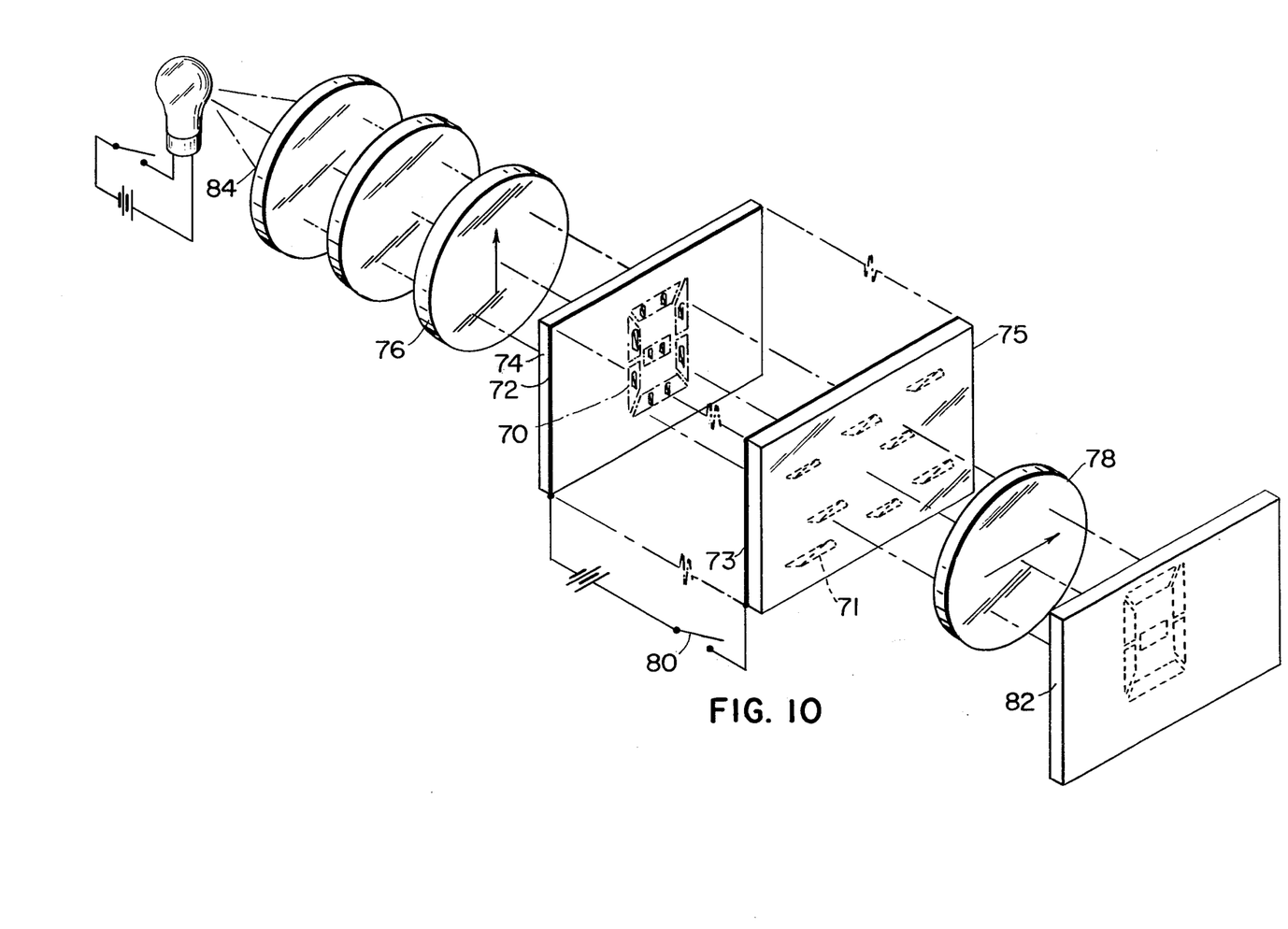
FIG. 10 is a diagrammatic view of an electro-optical system for reproducing an image which has been etched in an alignment film which has an electrode film thereunder.

As shown in FIG. 10, which is similar to FIG. 6, the alignment film 70 has a pattern etched therein. The etched alignment film 70 is on an electrode film 72 on the substrate 74. An unetched alignment film 71 is on the electrode film 73 on substrate 75. The plane of polarization of polarizer 78 is at a 90 degree angle with respect to plane of polarization of polarizer 76. When a voltage is not applied between the electrode films 72 and 73, by not closing switch 80, the etched pattern in alignment film 70 is made visible on screen 82 by means of light 84. When a voltage is applied between the electrode films 72 and 73 by closing switch 80, the etched pattern in alignment film 70 is not visible on screen 82, and the screen 82 becomes dark.

What is claimed is:

1. A structure adapted to produce a preferential orientation of molecules of a selected liquid crystal material placed in contact therewith comprising:
   a transparent substrate having at least one major flat planar surface;
   a transparent film of a selected alignment material deposited on said one major surface at a selected acute angle of from about 10° to about 89° to a line normal to said surface and adapted to contact said liquid crystal material.

2. A structure as claimed in claim 1, wherein said selected liquid crystal material is a nematic liquid crystal material and said selected alignment material is selected from the group consisting of platinum, gold, tin, lead, aluminum, copper, silver, silicon monoxide, and chromium and is vacuum deposited on said surface.

3. A structure as claimed in claim 2, further comprising a conductive, transparent electrode film formed on said substrate underneath said alignment film.

4. A structure as claimed in claim 2, wherein said selected alignment film material is electrically conductive and is deposited to a thickness sufficient to form continuous conductive areas to serve as both an electrode film and an alignment film.

5. A structure as claimed in claim 1, wherein said selected liquid crystal material is a nematic liquid crystal material and said selected alignment material is selected from the group consisting of platinum, gold, tin, lead, aluminum, silver, silicon monoxide, and chromium and is vacuum deposited on said surface.

6. In a structure suitable for the preferential orientation of molecules of a selected liquid crystal material placed in contact therewith having a transparent substrate with a conductive transparent electrode film and a transparent alignment film formed thereon, the improvement comprising said alignment film being a selected alignment material deposited on a major flat planar surface of said substrate at a selected acute angle of from about 10° to 89° to a line normal to said surface.

7. A structure as claimed in claim 6, wherein said selected liquid crystal material is a nematic liquid crystal material and said selected alignment material is selected from the group consisting of platinum, gold, tin, lead, aluminum, copper, silver, silicon monoxide, and chromium.

8. A structure as claimed in claim 6, wherein said selected liquid crystal material is a nematic liquid crystal material and said selected alignment material is selected from the group consisting of platinum, gold, tin, lead, aluminum, silver, silicon monoxide, and chromium.

9. A structure suitable for the preferential orientation of molecules of a selected liquid crystal material placed in contact therewith comprising:
   a transparent substrate having at least one major flat planar surface;
   a transparent electrode film on said planar surface; and
   a transparent alignment film selected from the group consisting of platinum, gold, tin, lead, aluminum, copper, silver, silicon monoxide and chromium, deposited on said surface at an acute angle of from about 10° to about 89° to the normal and overlying said electrode film.

10. A structure suitable for the preferential orientation of molecules of a selected liquid crystal material placed in contact therewith comprising:
    a transparent substrate having at least one major flat planar surface;
    a transparent electrode film on said planar surface; and a transparent alignment film selected from the group consisting of platinum, gold, tin, lead, aluminum, silver, silicon monoxide and chromium, deposited on said surface at an acute angle of from about 10° to about 89° to the normal and overlying said electrode film.

11. A structure adapted to produce a preferential orientation of molecules of a selected liquid crystal material placed in contact therewith comprising:

a transparent substrate having at least one major flat planar surface;

a transparent film of a selected alignment material deposited on said one major surface at a selected acute angle of about 80° to a line normal to said surface and adapted to contact said liquid crystal material to produce said preferential orientation.

12. A structure adapted to produce a preferential orientation of molecules of a selected liquid crystal material placed in contact therewith comprising:

a transparent substrate having at least one major flat planar surface;

a transparent film of a selected alignment material deposited on said one major surface at a large angle to a line normal to said surface and adapted to contact said liquid crystal material to produce a preferential orientation of molecules thereof in the general direction of deposit of said material.

13. In a structure suitable for the preferential orientation of molecules of a selected liquid crystal material placed in contact therewith having a transparent substrate with a conductive transparent electrode film and a transparent alignment film formed thereon, the improvement comprising said alignment film being a selected alignment material deposited on a major flat planar surface of said substrate at an angle of about 80° to a line normal to said surface.

14. In a structure suitable for the preferential orientation of molecules of a selected liquid crystal material placed in contact therewith having a transparent substrate with a conductive transparent electrode film and a transparent alignment film formed thereon, the improvement comprising said alignment film being a selected alignment material deposited on a major flat planar surface of said substrate at a large angle to a line normal to said surface to produce preferential orientation of said liquid crystal molecules substantially in the direction of deposit of said selected alignment material.

15. A structure suitable for the preferential orientation of molecules of a selected liquid crystal material placed in contact therewith comprising:

a transparent substrate having at least one major flat planar surface;

a transparent electrode film on said planar surface; and a transparent alignment film selected from the group consisting of platinum, gold, tin, lead, aluminum, silver, silicon monoxide, and chromium, deposited on said surface at an angle of about 80° to a line normal to said surface and overlying said electrode film.

16. A structure suitable for the preferential orientation of molecules of a selected liquid crystal material placed in contact therewith comprising:

a transparent substrate having at least one major flat planar surface;

a transparent electrode film on said planar surface; and a transparent alignment film selected from the group consisting of platinum, gold, tin, lead, aluminum, silver, silicon monoxide, and chromium, deposited on said surface at a large angle to a line normal to said surface and overlying said electrode film to produce preferential orientation of liquid crystal molecules substantially in the direction of deposit of said material.

17. A structure adapted to produce a preferential orientation of molecules of a selected liquid crystal material placed in contact therewith comprising:

a transparent substrate having at least one major flat planar surface;

a transparent film of a selected alignment material deposited on said one major surface at a large, acute angle to a line normal to said surface and adapted to contact said liquid crystal material.

18. In a structure suitable for the preferential orientation of molecules of a selected liquid crystal material placed in contact therewith having a transparent substrate with a conductive transparent electrode film and a transparent alignment film formed thereon, the improvement comprising said alignment film being a selected alignment material deposited on a major flat planar surface of said substrate at a large acute angle to a line normal to said surface.

* * * * *

Disclaimer 4,165,923.—*John L. Janning*, Dayton, Ohio. LIQUID CRYSTAL ALIGNMENT STRUCTURE. Patent dated Aug. 28, 1979. Disclaimer filed Nov. 10, 1980, by the assignee, *NCR Corporation*.

The term of this patent subsequent to Sept. 10, 1991, has been disclaimed.

[*Official Gazette January 27, 1981.*]